US012643114B2

(12) United States Patent
Bernstein

(10) Patent No.: US 12,643,114 B2
(45) Date of Patent: Jun. 2, 2026

(54) MULTI-STAGE FLUIDIC OSCILLATOR WITH VARIABLE FREQUENCY ASSEMBLY AND METHOD

(71) Applicant: DLHBOWLES, INC., Canton, OH (US)

(72) Inventor: Samuel Bernstein, Annapolis, MD (US)

(73) Assignee: ABC TECHNOLOGIES INC., Toronto (CA)

( * ) Notice: Subject to any disclaimer, the term of this patent is extended or adjusted under 35 U.S.C. 154(b) by 709 days.

(21) Appl. No.: 18/076,837

(22) Filed: Dec. 7, 2022

(65) Prior Publication Data

US 2023/0173510 A1 Jun. 8, 2023

Related U.S. Application Data

(60) Provisional application No. 63/286,783, filed on Dec. 7, 2021.

(51) Int. Cl.
*B05B 1/08* (2006.01)

(52) U.S. Cl.
CPC .................................... *B05B 1/08* (2013.01)

(58) Field of Classification Search
CPC .... B05B 1/08; B05B 1/04; B05B 1/34; B05B 1/3478; F15B 21/12; F15C 1/22; F04F 5/46–469; G05D 16/04–109
USPC .............................. 137/826; 239/589.1, 101
See application file for complete search history.

(56) References Cited

U.S. PATENT DOCUMENTS

| | | | |
|---|---|---|---|
| 3,185,166 | A | 5/1965 | Horton |
| 4,694,992 | A | 9/1987 | Stouffer |
| 4,709,622 | A | 12/1987 | Stouffer et al. |
| 5,333,787 | A | 8/1994 | Smith et al. |
| 6,729,564 | B2 | 5/2004 | Srinath et al. |
| 6,904,626 | B1 | 6/2005 | Hester |
| 7,677,480 | B2 | 3/2010 | Russell et al. |
| 7,766,261 | B1 | 8/2010 | Santamarina et al. |

(Continued)

FOREIGN PATENT DOCUMENTS

| | | |
|---|---|---|
| DE | 2421008 | 11/1974 |
| WO | 0207893 A1 | 1/2002 |

OTHER PUBLICATIONS

Patent Cooperation Treaty (PCT), International Search Report and Written Opinion for Application PCT/US2022/052126 filed Dec. 7, 2022, mailed Apr. 24, 2023, International Searching Authority, EP.

(Continued)

*Primary Examiner* — Arthur O. Hall
*Assistant Examiner* — Juan C Barrera
(74) *Attorney, Agent, or Firm* — Dickinson Wright PLLC

(57) ABSTRACT

A multi-stage fluidic oscillating circuit and system can produce an output spray of selectively varying frequency, even though the fluid supplied to the circuit/system is maintained at a substantially constant pressure. The circuit is characterized by two successive stages, each having a power nozzle aligned around a central axis. Upstream and downstream inertance loops are included in each of the stages, with fluid from one of these loops being selectively released to affect the frequency change in the output spray. The circuit is also characterized by a splitter and optional dog ear style protrusions formed in the outlet of the circuit.

18 Claims, 5 Drawing Sheets

(56) References Cited

U.S. PATENT DOCUMENTS

| | | | |
|---|---|---|---|
| 8,869,320 B1 | 10/2014 | Santamarina et al. | |
| 9,339,825 B2 | 5/2016 | Koklu | |
| 9,765,491 B2 | 9/2017 | Gopalan et al. | |
| 10,066,351 B2 | 9/2018 | Gopalan et al. | |
| 2014/0102542 A1* | 4/2014 | Raghu ..................... | F15B 21/12<br>138/30 |
| 2014/0299672 A1 | 10/2014 | Gopalan et al. | |
| 2016/0129689 A1 | 5/2016 | Gomi et al. | |
| 2017/0350081 A1 | 12/2017 | Gopalan et al. | |

OTHER PUBLICATIONS

Office Action in U.S. Appl. No. 18/224,601, mailed May 6, 2025, 11 pages.

* cited by examiner

MULTI-STAGE FLUIDIC OSCILLATOR WITH VARIABLE FREQUENCY ASSEMBLY AND METHOD

CROSS REFERENCE TO RELATED APPLICATIONS

This application claims priority to U.S. provisional patent application Ser. No. 63/286,783 filed on Dec. 7, 2021, the entire disclosures of which is incorporated by reference.

TECHNICAL FIELD

The disclosure relates generally to a nozzle producing a fluidic oscillating jet and, more particularly, to a fluidic circuit/insert, a nozzle assembly, a system, and various methods of implementing and attaining the same relying upon a multi-stage fluidic arrangement capable of producing and accommodating variable frequency spray outputs without necessarily changing the pressure of fluid supplied to the insert.

BACKGROUND

Pressurized and specially directed fluid jets are often employed in spas, massaging systems, and various relaxation or therapeutic devices. In practices, these implements are provided with a pressurized and/or pre-conditioned (e.g., heated) fluid, which is dispensed through a spray assembly. These assemblies often have fixed, directed, and/or moving nozzles so as to create a desired and sometimes variable pattern. Conventional assemblies, particularly those used in spas and hot tubs, relied upon rotating or moving parts, which made them prone to wear and failure.

More recently, fluidic oscillators represent a specialized class of sprayers/nozzles that create oscillating two or three dimensional spray patterns without the need for any moving parts. Instead, fluidic oscillators employ specially shaped flow chambers, channels, and other features which induce fluid flow phenomena so as to produce desired spray patterns. U.S. Pat. Nos. 8,869,320 and 9,765,491 provide examples of how fluidic oscillators have been incorporated for use in spas. Other examples of fluidic oscillating implements include U.S. Pat. No. 7,677,480 and, in which the fluidic oscillators can be manufactured onto inserts or "chips" that sealingly fitted into housing and/or other components in the flowpath of spaying assemblies. All of the aforementioned patents are incorporated by reference, although it will be understood that the fluid pressure and/or viscosity, heat, and other factors specific to a given implementation may limit the utility of certain fluidic oscillator designs and principles.

For example, fluidic oscillators typically operate at a set frequency for a given pressure. Certain installations may not be equipped with appropriate pumps or fluid control systems to quickly or reliably change fluid pressure, meaning the frequency of the fluidic oscillator chip cannot be changed. Further, the construction of spray assemblies/nozzles and the need for low tolerance fit and sealing serve to make it impractical to replace inserts/chips in certain applications.

Particularly in the realm of spas and massaging, relaxation, or similar therapeutic devices, it would be desirable to have a single fluidic oscillator design and spray system capable of delivering spray patterns at a number of different frequencies (i.e., in terms of the oscillation of the spray exiting the outlet of the insert), irrespective of pressure.

U.S. Pat. No. 9,339,825 describes a multi-layer frequency controlling fluidic oscillating chip in which an inlet leads to a feedback loop circuit that acts as a fluid diverter to distribute the resultant oscillating spray into separate and space apart ports. These ports feed a main oscillating circuit formed in a separate layer on the chip, although this second chip requires a separate inlet fed from an opposite side of the chip (in comparison to the feedback loop circuit). While the resultant structure decouples frequency control of the main oscillating chip from its amplitude, the multilayer chip presents manufacturing and assembly challenges. It also creates a "master-servant" style fluidic circuit in which two separate inlet feeds from opposing planar facings of the chip must be employed.

A simple, single layer insert design capable of producing variable frequencies would be welcomed. Similarly, a design with a single inlet feed is needed and a system capable of accommodating a user to simply switch between the frequency modes is needed.

SUMMARY OF THE INVENTION

A fluidic oscillator design, circuit, and insert/chip are contemplated in which a constant pressure fluid input yields a variable frequency oscillating output spray or jet. The design employs two separate inertance loops associated with separate fluidic power nozzles and interaction chambers arranged in series. At least one of these loops includes a gate to allow for selective communication with ambient fluid (i.e., fluid beyond the outlet of the circuit, presumably having already passed through the circuit), so as to alter the frequency of the output jet in a predetermined and desired manner. The design can also use a splitter and optional dog ear protrusions in or near the outlet to further enhance and fine tune the traits of the output.

Further reference should be made to the appended or incorporated information embraced by this disclosure, including any and all claims, drawings, and description. While specific embodiments may be identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation and further understanding of all the various aspects of this invention may be better understood by reference to the drawings, in which:

FIG. 8A is a cross sectional perspective view of the nozzle assembly of FIG. 7, while

DETAILED DESCRIPTION

Figure 1:
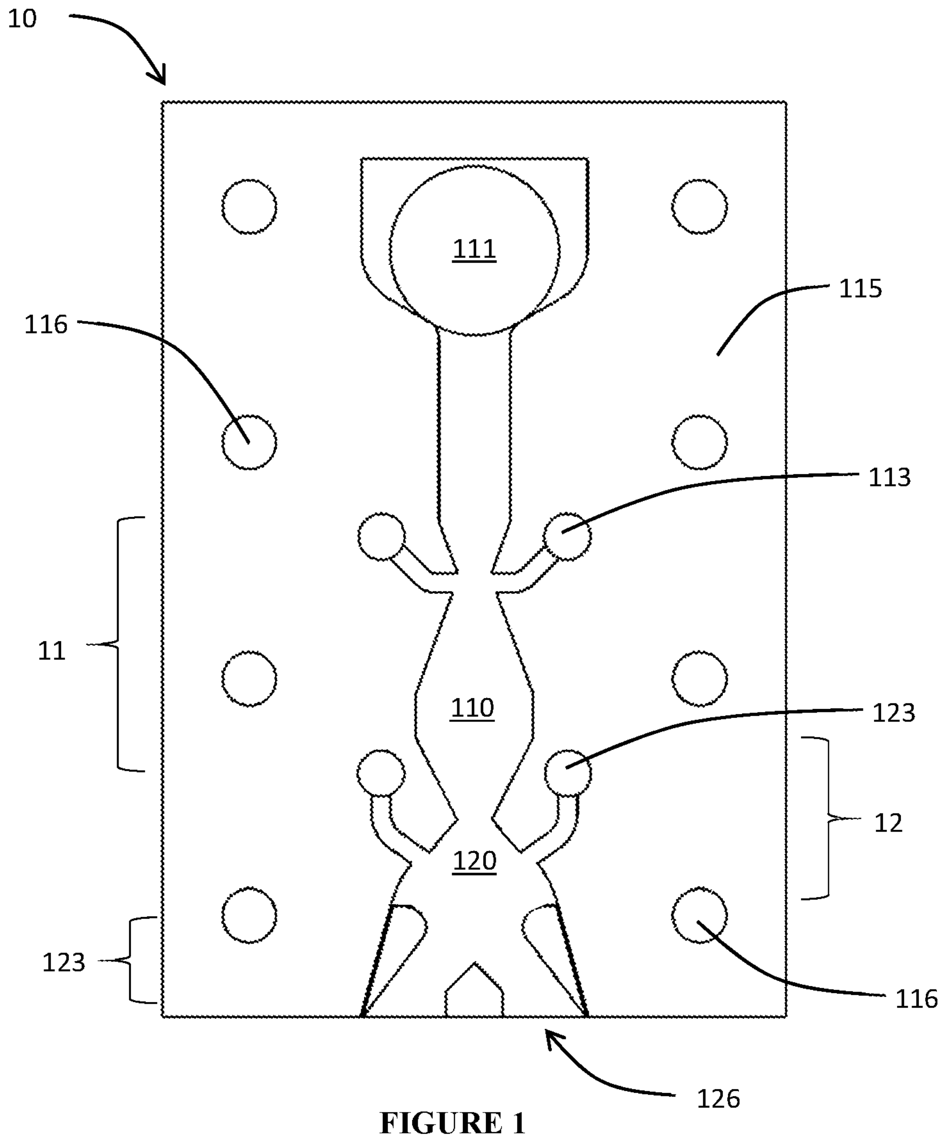
FIG. 1 is a top plan view of one aspect of the multi-stage fluidic oscillator insert contemplated herein.

The following description and any reference to the drawings and claims are merely exemplary, and nothing should limit alternatives and modifications that may be possible while adhering to the spirit and scope of the invention. Also, the drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

As used herein, the words "example" and "exemplary" mean an instance or illustration of broader concept; however, use of these words do not necessarily indicate a required, key, or preferred aspect or embodiment. Similarly, the word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise. Approximating language such "about" or "substantially" may be used (or, when consistent with context and reasonable expectations, implied) so as to modify quantitative representations, in which cases the stated value (s)/range(s) may be modified within the reasonable expectations of this art field and not necessarily limited to the precise value specified (unless specifically indicated herein as being precise or critical).

Figure 2A:
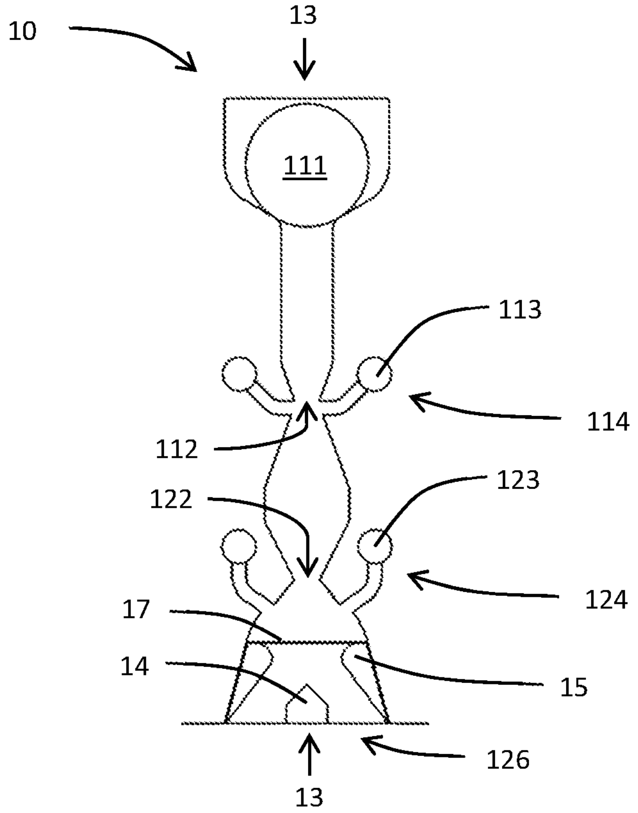
FIGS. 2A and 2B are schematic views of the fundamental features and defined dimensions of the multi-stage fluidic oscillator design contemplated in the various disclosed aspects herein.
Figure 2B:
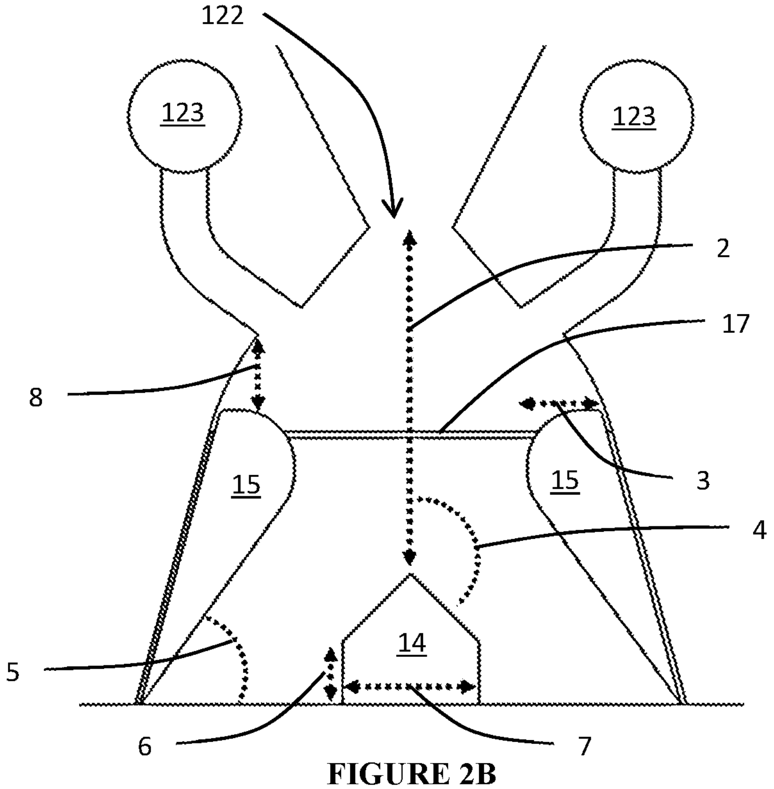

With reference to FIG. 1, a multi-stage fluidic oscillator design is contemplated, while FIGS. 2A and 2B provide insights on the terminology and certain definitional aspects of the design. The fluidic oscillator circuit or insert 10 is formed in flat, polygonal body 115. Coupling and/or location features, such as bolt holes 116, may be provided around the perimeter to allow for positioning and attachment to the housing 21 of the spray assembly 20.

Contoured sidewalls, apertures, and other features generally define the fluidic circuit, with the inlet 111 coupled to a pressured fluid source. This source will feed pressurized fluid, such as water or air, into the circuit, where it will traverse from the inlet 111 to the outlet 126, which release the fluid as jet or direct spray which oscillates between sidewalls 125.

Specific features within the circuit 10 dictate the pattern and frequency of oscillation. It will be understood that adjustment to the size and shape of these features (such as the splitter 14), as well as the necessity to even provide items (such as the dog ears 15), can significantly impact the characteristics of the jet exiting the outlet 126.

The circuit 10 actually comprises to separate oscillation-inducing stages 11, 12. Each stage includes a power nozzle 112, 122 and an interaction chamber 110, 120, as well as inertance ports 113, 123 which form part of larger inertance loops 114, 124. Notably, the tubing or channel length of these loops 114, 124 may be adjusted, and one or both will be provided with a gate 22, although the tubing and the gate are not necessarily formed within the common spatial plane along which the rest of the features of the circuit 10 reside.

In terms of orientation, a central axis along line 13-13 bisects the circuit, preferably through the midpoint of both power nozzles 112, 122. Axis 13 also intersects (preferably at its midsection) with the splitter 14. In one aspect, splitter 14, dog ear-style protrusions 15 (preferably formed into the sidewall 125 in the outlet region 123), and ports 113, 123 are formed symmetrically around the axis 13. In one aspect, the inlet 111 can also be centered on the axis, along with the interaction chambers 110, 120.

As noted above, the size, shape, and positioning of the oscillation inducing features can be adjusted in a number of ways. In order to fully appreciate these adjustments, the features highlighted in FIG. 2B are helpful. In particular, the inventors have found that the axial distance 8 (i.e., parallel to axis 13) between the top of the protrusions 15 and the bottom edge of the ports 113, 123 (i.e., where the ports enter the interaction chambers 110, 120) can be adjusted, along with the distance 2 from the top of top or upstream edge 148 of the splitter 140, the dog ear prominence 3 (i.e., the transverse distance where the protrusions 15 extend toward the axis 13 from their junction point 155 with the respective sidewall 125), the splitter angle 4 (i.e., the angle-usually/preferably obtuse-between the axis 13 and the straight line formed by sidewall 149), the dog ear angle 5 (i.e., the angle-usually/preferably acute-between a transverse/orthogonal axis that cuts laterally across the body 115 along its downstream/outlet 126 edge and through the axis 13) and the height 6 and width 7 of the splitter 14 when the splitter relies upon a substantially polygonal shape (as shown in FIGS. 2B, 4A, 5A, 6A, 6C, and elsewhere).

Figure 3A:
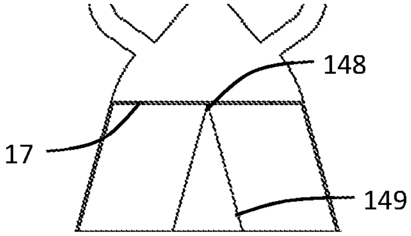
FIGS. 3A through 3C are isolated schematic views of aspects of the second stage of the fluidic oscillator design in which the positioning and shape of the splitter are adjusted and dog ears are not needed.
Figure 3B:
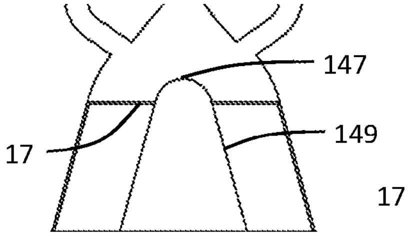
Figure 3C:
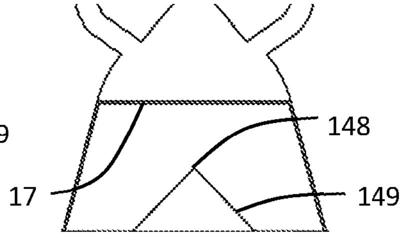
Figure 4A:
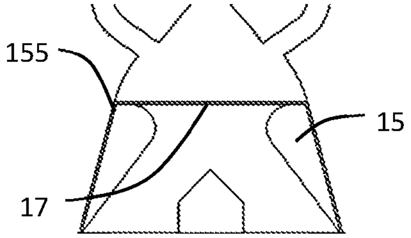
FIGS. 4A and 4B are isolated schematic views of aspects of the second stage of the fluidic oscillator design in which the positioning of the dog ears is adjusted and a further possible shape of the splitter is employed.
Figure 4B:
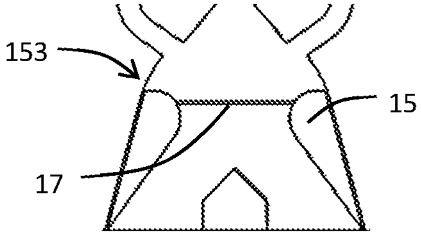
Figure 5A:
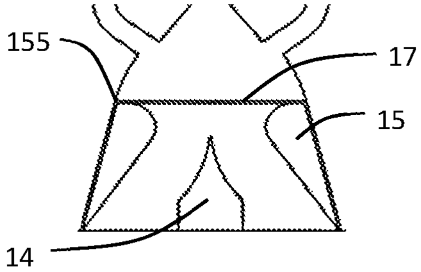
FIGS. 5A and 5B are isolated schematic views of aspects of the second stage of the fluidic oscillator design in which the shape of the splitter is adjusted.
Figure 5B:
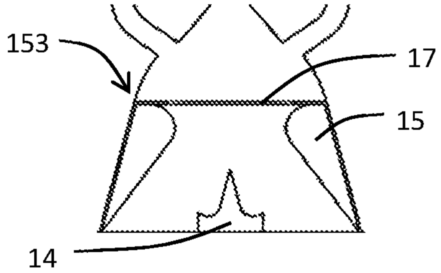
Figure 6A:
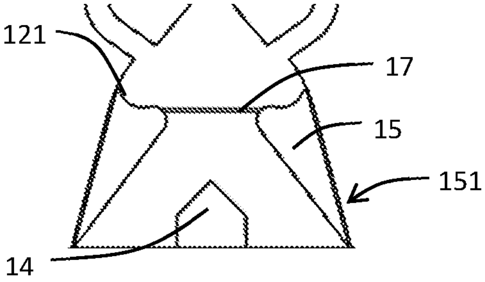
FIGS. 6A through 6D are isolated schematic views of aspects of the second stage of the fluidic oscillator design in which the positioning and shape of the dog ears are adjusted.
Figure 6B:
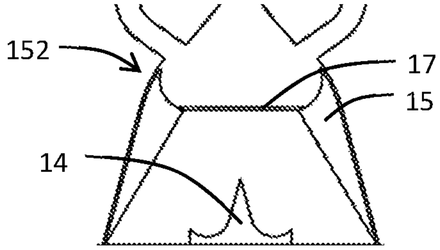
Figure 6C:
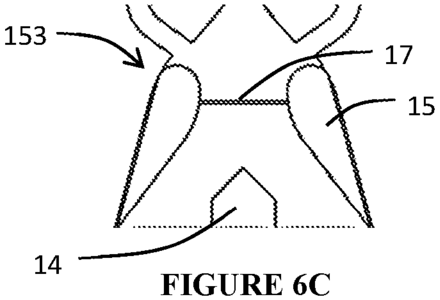
Figure 6D:
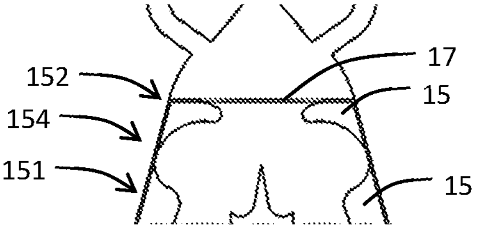
Figure 7:
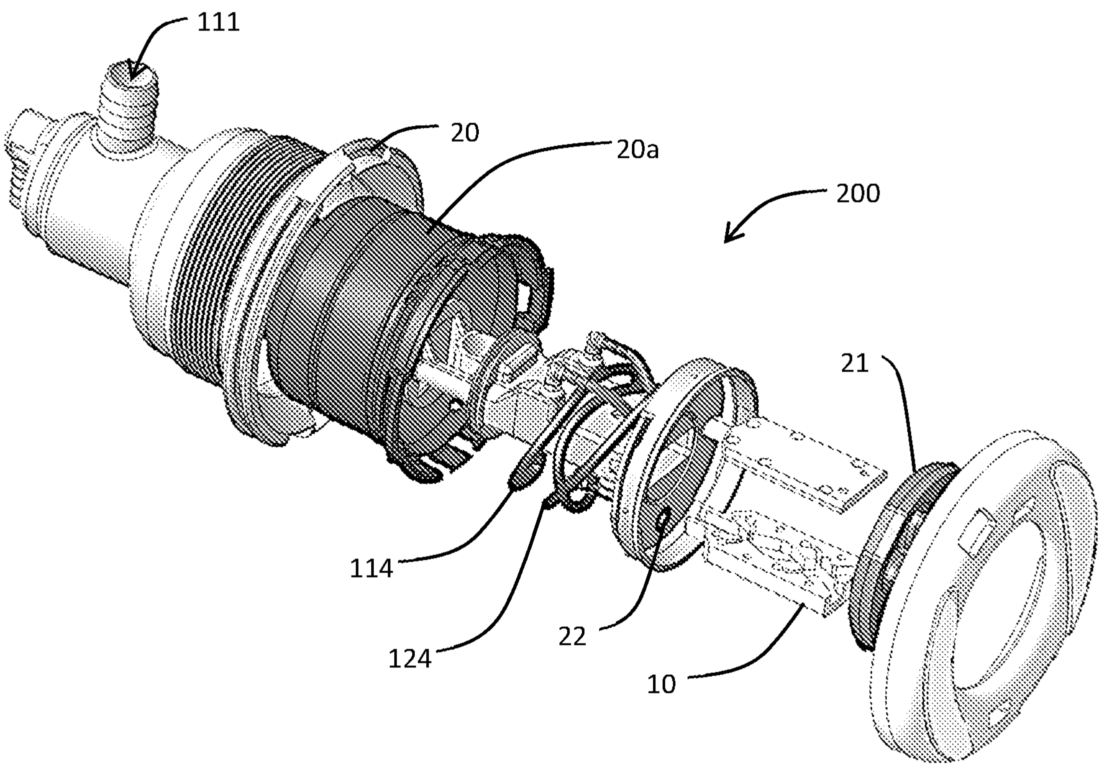
FIG. 7 is an exploded perspective view of the nozzle assembly according to various aspects contemplated herein.
Figure 8A:
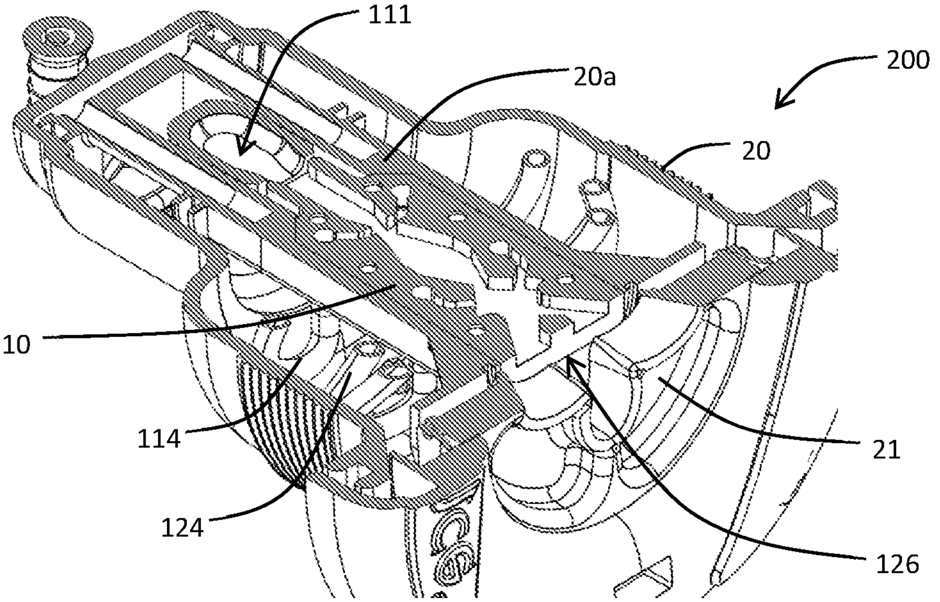
Figure 8B:
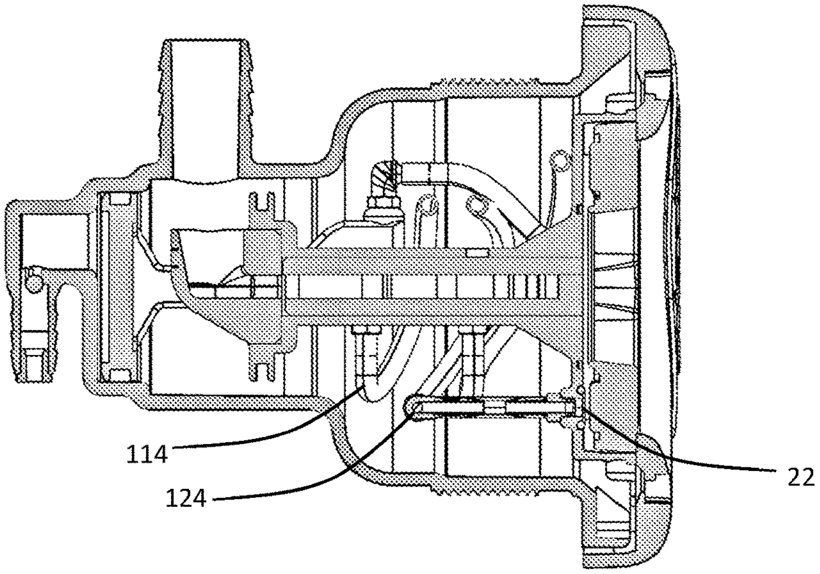
FIG. 8B is a complimentary cross sectional side view taken along a plane that is orthogonal to the view in FIG. 8A.
Figure 9A:
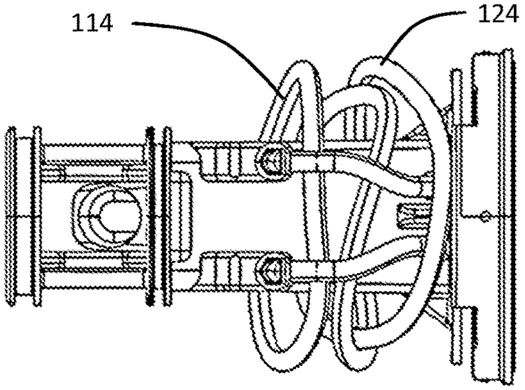
FIG. 9A is a top plan view, FIG. 9B a bottom plan view, FIG. 9C a left side view, and FIG. 9D a right side view, all of an isolated portions of the nozzle assembly including the inner housing (holding the insert/chip), the mode switch plate, and the tubing and connectors forming the upstream and downstream inertance loops.
Figure 9B:
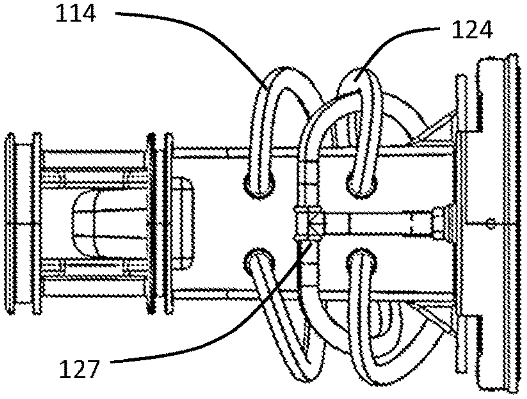
Figure 9C:
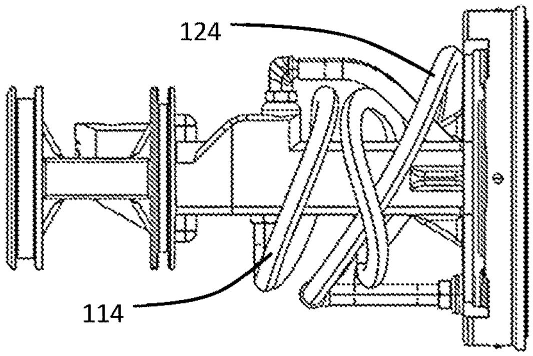
Figure 9D:
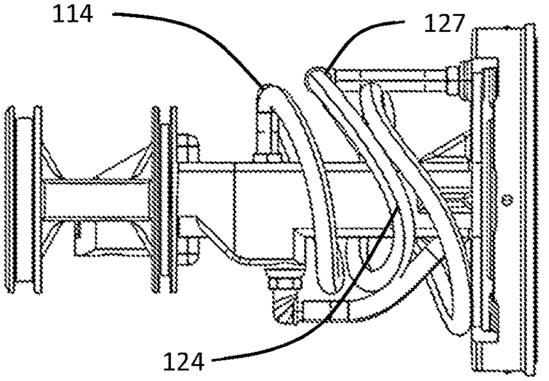

As further illustrated in FIGS. 3A through 6D, the positioning of certain elements relative to the boundary line 17 defining the bottom or downstream edge of the interaction chamber 120 is also a useful variable. Here, the terminal edge 148 of the splitter may be on, above, or below line 17, with straight 149 or curving surfaces 147 facing upward, preferably centered about the axis 13, and exposed to the fluid flowing out of the power nozzle 122 and through/around the protrusions 15. Notably, and as seen in FIGS. 3A through 3C, protrusions 15 are not required, and the splitter's top surface can be pointed 148 or curved 147. When curved, the surface 147 is preferably centered on the axis 13 so as to be symmetrical on either transverse side thereof.

Also, the protrusions 15 may take a variety of forms, although it is preferred for them to be symmetrical or substantially similar in shape and positioning. For example, the protrusions 15 may have a teardrop shaped curve 153 relative to the sidewall 125. Alternatively, the upper region 151 may curve up so as to form a rounded corner in the bottom edges 121 of the second interaction chamber 12. Additionally or alternatively, the bottom region 152 may taper off toward the sidewall 125 (as in the tear drop shape) or it may curve toward the splitter 14 so as to impart a C-shape 154 to the entirety of the protrusion 15. In some aspects, when a downward curve (i.e., teardrop) shape is employed in the upper region 151, a tangent line can be drawn along the boundary 17 (or run parallel to it). Thus, the top of protrusions 15 are usually on or above the line 17, whereas the top of the splitter 14 (the height 6 plus the axial distance/height added by the point 149 or apex of curve 147) can extend above, reside on, or remain below line 17. Also, in certain aspects, both protrusions 15 will usually be spaced apart from the splitter sufficiently so that a pair of lines both drawn parallel to the axis 13 can cross over the boundary 17 and the bottom-most edge of the outlet 126 without coming into contact with either protrusion or the splitter. In other aspects, the edges of the splitter 14 (i.e., the ends of splitter width 7) might overlap in the axial direction with the inner edges of the protrusions (i.e., the dog ear prominence 3). In all aspects, the splitter 14 defines two separate flowpaths (in conjunction with each protrusion 15 or the sidewalls 125) in the outlet region 123 for fluid from the inlet 111 to traverse the circuit 10 and exit via outlet 126.

An embodiment of a nozzle assembly 200 is illustrated in FIGS. 7 through 9D. A housing 20 that is configured to receive an insert 10 considered a multi-stage oscillator having a fluid circuit pathway formed therein. In some aspects, the housing 20 might include integral tubing/ports that deliver pressurized fluid to the inlet 111. As noted above, the fluid remains at a constant or substantially constant pressure, with the insert 10 being designed to output jets having selected, different oscillating frequencies depending on the comparative conditions within the inertance loops 114, 124. The housing 20 can be made of multiple parts, coaxially arranged, with an inner carrier 20*a* surrounding and receiving the insert 20*a*, the outer shell 20 coaxially fitted around the carrier 20*a* to protect and conceal the tubing forming the inertance loops, and a switch plate or mode disc 21 attached to a distal end of the housings 20 and/or carrier 21*a*. Various other decorative elements and/or air tubing might also be contained within the housing 20, although these elements are not essential to operation of the fluidic oscillator.

The insert 10 is configured to fit within a cavity in the housing 20 and be in fluid communication with a first set of tubing that form a first inertance loop 114 and a second set of tubing that forms a second inertance loop 124. The tubing provides for fluid communication at particular points along the fluid circuit pathway. Generally speaking, the in the inertance loops 114, 124 allows fluid to temporarily divert as it flows across the common spatial plane of circuit 10 by flowing between the ports 113, 123.

In one embodiment, a gate 22 may be formed with a Y connector 127 which attaches to a gate 22 positioned along a front face of the housing. A rotatable mode plate 21 may be attached to the housing and include a patterned surface to allow a user to rotate or otherwise modify the position of the disc relative to the mode switch port to toggle the modes of the nozzle assembly. An O-ring may circumscribe the mode switch port and be configured to engage a ramp or surface of the back side of the mode disc to sufficiently block or unblock the mode switch port (i.e., the gate) and to toggle the pressure of the second tubing and thus cause a modified flow through the fluid circuit pathway.

When the gate is opened, a central opening in the plate 21 allow ambient fluid (i.e., fluid outside of the outlet of the insert/spray assembly) to communicate with a selected inertance loop on/in the fluidic oscillating circuit. While not intending to be limited by any theory of operation, it is believed that the introduction of another pathway within the loop inertance loop affects a pressure change in that loop that will impact the resultant frequency of fluid passing through the power nozzle and/or outlet of the oscillating stage 11, 12 that is/are associated with the gated loop. This change in frequency then carries down along the circuit/fluid flow path to affect a change the oscillation frequency of the fluid provided at the inlet.

As an example, the inventors have created circuits 10 using the various disclosed arrangements herein in which the oscillating flow from the first stage of the circuit creates a higher frequency of about 10-30 Hz. The second stage creates a lower frequency of about 3-10 Hz. Adjustments to and within these ranges can be achieved by employing one or a combination of the frequency altering structures described and/or depicted herein.

The mode switch port (i.e., gate 22) and mode disc (i.e., plate 21) may be used to adjust ambient fluid communication, thereby impacting the flow conditions in the first or upstream stage and/or the second or downstream stage. However, for purposes of creating a simplified system 20, the gate 22 might comprise a smaller shutter that merely slides so as to block the opening or the opening might be physically blocked by the user during use (e.g., by placing a finger over the opening). Other configurations and physical embodiments of the gate 22 are possible, with the understanding that the key is providing a further possible flow path for ambient fluid to communicate with/into/out of the specific inertance loop 114, 124.

As used throughout this disclosure, upstream is relative and/or closer to the inlet of the circuit, whereas downstream is relative and/or closer to the circuit's outlet. In the same manner, above may be synonymous with upstream while below is synonymous with downstream. Thus, it will be understood that fluid flow from the inlet through the circuit and out of the outlet, thereby producing an oscillating spray or jet based upon the various structures and features described herein. Other terms of art within the fluidic oscillation field are used herein and should be afforded their well understood meanings based upon common knowledge in this field.

In view of the foregoing, one aspect of the invention contemplates a multi-stage fluidic oscillator design, preferably as embodied by an insert or chip, capable of oscillating its output jet at a plurality of different frequencies based upon a constant or substantially constant fluid pressure. This circuit includes a a first stage consisting of an inlet feeding a fluid directly to a first power nozzle, a first interaction chamber, and an upstream inertance loop having ports interposed between the first power nozzle and the first interaction chamber; a second stage consisting of a second power nozzle receiving fluid directly from the first interaction chamber, a second interaction chamber feeding fluid into an outlet region immediately downstream from the second interaction chamber, and a downstream inertance loop having ports interposed between the second power nozzle and the second interaction chamber; wherein the outlet region includes at least one frequency accommodating structure positioned on or between sidewalls defining the outlet; and wherein at least one of the upstream or the downstream inertance loop is configured to selectively allow ambient fluid communication so as to change a frequency of oscillation in the fluid passing through the outlet. Additionally, the insert could include anyone or combination of the following features:

- wherein the first and second sidewalls are symmetrical;
- wherein the downstream inertance loop is configured to selectively allow ambient fluid communication;

- wherein the first and second stages are formed in a common spatial plane;
- wherein two ports are provided in the upstream inertance loop on opposing sidewalls defining the first interaction chamber;
- wherein two ports are provided in the downstream inertance loop on opposing sidewalls defining the second interaction chamber;
- wherein the at least one frequency accommodating structure comprises a splitter positioned at least partially on a central axis passing through the first and second power nozzles;
- wherein the at least one frequency accommodating structure consists of a pair of symmetrical protrusions extending away from each sidewall defining the outlet and a splitter spaced apart from the pair of protrusions and positioned on or below boundary line defining a downstream edge of the second interaction chamber, with the splitter spaced apart from the protrusions;
- wherein the pair of symmetrical protrusions are teardrop-shaped curves positioned on or above the boundary line;
- wherein the boundary line forms a tangent to an uppermost edge of the pair of symmetrical protrusions at a point where the pair of symmetrical protrusions attach to the sidewalls defining the outlet;
- wherein the pair of symmetrical protrusions include an upper region positioned on or above the boundary line and a lower region extending away from the sidewalls defining the outlet so as form a C-shape;
- wherein the upper region of the pair of symmetrical protrusions defines a curing surface above the boundary line so as to impart rounded corners in the lower portions of the second interaction chamber;
- wherein the splitter is the only frequency accommodating structure;
- wherein the splitter has an upstream terminal edge positioned on or above a boundary line defining a downstream edge of the second interaction chamber;
- wherein the splitter has an upstream terminal edge positioned on or below a boundary line defining a downstream edge of the second interaction chamber;
- wherein the splitter has an upstream terminal edge defined by two straight sidewalls defining a splitter angle (preferably obtuse in spec); and
- wherein the splitter has an upstream terminal edge defined by a curved surface formed symmetrically about the central axis.

Another aspect of the invention contemplates a spray system, such as might be used in a spa, massaging gun/device, and the like. This system incorporate any iteration of the foregoing multi-stage fluidic oscillator designs, so as to allow the system to output jets at plurality of different oscillating frequencies without deliberately altering the pressure of the fluid provided to the system. The system includes a housing providing fluid at a substantially constant pressure to the inlet of the fluidic oscillator circuit and a mode switch plate affixed to the housing and positioned proximate the outlet of the multi-stage fluidic oscillator circuit. In some aspects, the mode switch plate is rotatable relative to: (a) the housing so as to block or open a gate in the downstream inertance loop, and/or (b) the central axis so as to block or open a gate in the downstream inertance loop.

Notably, to the extent specific features or outcomes result from the upstream and/or downstream inertance loops, the splitter, the dog ear protrusions, and/or the multi-stage nature of the circuit (with its distinct power nozzles and interaction chambers positioned about an axis and/or in series, preferably in a common spatial plane), persons of ordinary skill will appreciate the invention also contemplates a method for producing, from a constant or substantially constant fluid, an oscillating output spray of that fluid where the frequency can be selectively varied. These methods might include a use of the aforementioned circuit, as well as the more generalized method of providing a fluid having substantially constant pressure through a first power nozzle, diverting a portion of the fluid through an upstream inertance loop and supplying a remainder to a first oscillating chamber so as to define/be analogous to the first stage noted above. Immediately thereafter, the fluid exiting the first oscillating chamber is passed through a second power nozzle, with a portion thereafter being diverted to a downstream inertance loop and the remainder being supplied to a second oscillating chamber and out of an outlet including a splitter and optional dog ear-style protrusions. Depending on the desired frequency, the fluid that is diverted into the downstream inertance loop may be released through a switch port (rather than passing through the outlet providing the oscillating jet).

All components of the pump dispenser should be made of materials having sufficient flexibility and structural integrity, as well as a chemically inert nature. The materials should also be selected for workability, cost, and weight. Common polymers amenable to injection molding, extrusion, or other common forming processes may have particular utility, the same as various metals, alloys, and additive manufacturing materials.

References to coupling in this disclosure are to be understood as encompassing any of the conventional means used in this field. This may take the form of snap- or force fitting of components, although threaded connections, bead-and-groove, and slot-and-flange assemblies could be employed. Adhesive and fasteners could also be used, although such components must be judiciously selected so as to retain the intended functionality of the assembly.

In the same manner, engagement may involve coupling or an abutting relationship. These terms, as well as any implicit or explicit reference to attachment of parts, should be considered in the context in which it is used, and any perceived ambiguity can potentially be resolved by referring to the drawings.

Although the disclosure has been described with reference to specific embodiments detailed herein, other embodiments can achieve the same or similar results. Certain variations and modifications of the disclosure can be undertaken by those skilled in the art at the time this invention was made, and this disclosure and claims are intended to cover any and all such modifications and equivalents to the maximum extent permitted by applicable law.

The invention claimed is:

1. A multi-stage fluidic oscillator circuit comprising:

a first stage consisting of an inlet feeding a fluid directly to a first power nozzle, a first interaction chamber, and an upstream inertance loop defined by tubing or a channel that connects a first pair of ports, with the first pair of ports interposed between the first power nozzle and the first interaction chamber;

a second stage consisting of a second power nozzle receiving fluid directly from the first interaction chamber, a second interaction chamber feeding fluid into an outlet region immediately downstream from the second interaction chamber, and a downstream inertance loop defined by tubing or a channel that connects a second pair of ports, with the second pair of ports interposed between the second power nozzle and the second interaction chamber;

wherein the outlet region includes at least one frequency accommodating structure positioned on or between opposing sidewalls defining the outlet;

wherein the opposing sidewalls defining the outlet extend into the first and second stages so that the first pair of ports are positioned on opposing sidewalls and the second pair of ports are positioned on opposing sidewalls; and wherein at least one of the upstream or the downstream inertance loop includes a gate to selectively allow ambient fluid communication so as to change a frequency of oscillation in the fluid passing through the outlet.

2. The fluidic oscillator circuit of claim 1 wherein the first and second stages are formed in a common spatial plane.

3. The fluidic oscillator circuit of claim 1 wherein only the downstream inertance loop is configured to selectively allow ambient fluid communication.

4. The fluidic oscillator circuit of claim 1 wherein two gates are provided so that a first gate is associated with the upstream inertance loop and a second gate is associated with the downstream inertance loop.

5. The fluidic oscillator circuit of claim 1 wherein the at least one frequency accommodating structure comprises a splitter positioned at least partially on a central axis passing through the first and second power nozzles.

6. The fluidic oscillator circuit of claim 5 wherein the splitter is the only frequency accommodating structure.

7. A variable frequency oscillating spray system comprising:

a housing providing fluid at a substantially constant pressure to the inlet of the fluidic oscillator circuit of claim 5, and a mode switch plate affixed to the housing, positioned proximate the outlet of the multi-stage fluidic oscillator circuit, and rotatable relative to the central axis so as to block or open the gate, said gate positioned in the downstream inertance loop.

8. The fluidic oscillator circuit of claim 1 wherein the at least one frequency accommodating structure consists of a pair of symmetrical protrusions extending away from each sidewall defining the outlet and a splitter spaced apart from the pair of protrusions and positioned on or below a boundary line defining a downstream edge of the second interaction chamber, with the splitter spaced apart from the protrusions.

9. The fluidic oscillator circuit of claim 8 wherein the pair of symmetrical protrusions are teardrop-shaped curves positioned on or above the boundary line.

10. The fluidic oscillator circuit of claim 9 wherein the boundary line forms a tangent to an uppermost edge of the pair of symmetrical protrusions at a point where the pair of symmetrical protrusions attach to the sidewalls defining the outlet.

11. The fluidic oscillator circuit of claim 8 wherein the pair of symmetrical protrusions include an upper region positioned on or above the boundary line and a lower region extending away from the sidewalls defining the outlet so as form a C-shape.

12. The fluidic oscillator circuit of claim 11 wherein the upper region of the pair of symmetrical protrusions defines a curing surface above the boundary line so as to impart rounded corners in lower portions of the second interaction chamber.

13. The fluidic oscillator circuit of claim 8 wherein the splitter has an upstream terminal edge positioned on or above the boundary line defining the downstream edge of the second interaction chamber.

14. The fluidic oscillator circuit of claim 8 wherein the splitter has an upstream terminal edge positioned on or below the boundary line defining the downstream edge of the second interaction chamber.

15. The fluidic oscillator circuit of claim 8 wherein the splitter has an upstream terminal edge defined by two straight sidewalls defining a splitter angle.

16. The fluidic oscillator circuit of claim 8 wherein the splitter has an upstream terminal edge defined by a curved surface formed symmetrically about the central axis.

17. A variable frequency oscillating spray system comprising:

a housing providing fluid at a substantially constant pressure to the inlet of the fluidic oscillator circuit of claim 1, and a mode switch plate affixed to the housing and positioned proximate the outlet of the fluidic oscillator circuit.

18. The system of claim 17 wherein the mode switch plate is rotatable relative to the housing so as to block or open the gate, said gate positioned in the downstream inertance loop.

* * * * *